US010713519B2

(12) United States Patent
Bui et al.

(10) Patent No.: US 10,713,519 B2
(45) Date of Patent: Jul. 14, 2020

(54) AUTOMATED WORKFLOWS FOR IDENTIFICATION OF READING ORDER FROM TEXT SEGMENTS USING PROBABILISTIC LANGUAGE MODELS

(71) Applicant: ADOBE INC., San Jose, CA (US)

(72) Inventors: Trung Huu Bui, San Jose, CA (US); Hung Hai Bui, Sunnyvale, CA (US); Shawn Alan Gaither, Raleigh, NC (US); Walter Wei-Tuh Chang, San Jose, CA (US); Michael Frank Kraley, Lexington, MA (US); Pranjal Daga, West Lafayette, IN (US)

(73) Assignee: ADOBE INC., San Jose, CA (US)

( * ) Notice: Subject to any disclaimer, the term of this patent is extended or adjusted under 35 U.S.C. 154(b) by 120 days.

(21) Appl. No.: 15/630,779

(22) Filed: Jun. 22, 2017

(65) Prior Publication Data
US 2018/0373952 A1    Dec. 27, 2018

(51) Int. Cl.
| | |
|---|---|
| *G06K 9/34* | (2006.01) |
| *G06K 9/00* | (2006.01) |
| *G06K 9/72* | (2006.01) |
| *G06Q 10/10* | (2012.01) |
| *G06Q 10/06* | (2012.01) |
| *G06F 40/10* | (2020.01) |

(52) U.S. Cl.
CPC ............ *G06K 9/344* (2013.01); *G06F 40/10* (2020.01); *G06K 9/00456* (2013.01); *G06K 9/72* (2013.01); *G06Q 10/06* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 5,819,301 | A | 10/1998 | Rowe et al. |
| 5,832,530 | A | 11/1998 | Paknad et al. |

(Continued)

OTHER PUBLICATIONS

Aiello, M., Monz, C., Todoran, L., Worring, M. Document understanding for a broad class of documents. International Journal on Document Analysis and Recognition—IJDAR 5(1) (2002) 1-16. (Year: 2002).*

(Continued)

*Primary Examiner* — Iman K Kholdebarin
(74) *Attorney, Agent, or Firm* — Shook, Hardy and Bacon, L.L.P.

(57) ABSTRACT

The present invention is directed towards providing automated workflows for the identification of a reading order from text segments extracted from a document. Ordering the text segments is based on trained natural language models. In some embodiments, the workflows are enabled to perform a method for identifying a sequence associated with a portable document. The methods includes iteratively generating a probabilistic language model, receiving the portable document, and selectively extracting features (such as but not limited to text segments) from the document. The method may generate pairs of features (or feature pair from the extracted features). The method may further generate a score for each of the pairs based on the probabilistic language model and determine an order to features based on the scores. The method may provide the extracted features in the determined order.

20 Claims, 14 Drawing Sheets

(56) References Cited

U.S. PATENT DOCUMENTS

| | | | |
|---|---|---|---|
| 6,067,514 | A | 5/2000 | Chen |
| 6,662,158 | B1 * | 12/2003 | Hon ................. G10L 15/148 704/240 |
| 7,567,896 | B2 | 7/2009 | Coorman et al. |
| 7,774,192 | B2 | 8/2010 | Chang |
| 7,917,350 | B2 | 3/2011 | Mori et al. |
| 8,539,342 | B1 | 9/2013 | Lewis |
| 8,650,026 | B2 | 2/2014 | Ehsani et al. |
| 8,831,943 | B2 | 9/2014 | Emori et al. |
| 9,342,504 | B2 | 5/2016 | Ehsani et al. |
| 9,811,727 | B2 | 11/2017 | Koh et al. |
| 10,372,821 | B2 | 8/2019 | Chang et al. |
| 2002/0128821 | A1 | 9/2002 | Ehsani et al. |
| 2006/0150069 | A1 | 7/2006 | Chang |
| 2007/0260564 | A1 | 11/2007 | Peters et al. |
| 2008/0120092 | A1 * | 5/2008 | Moore ................. G06F 40/45 704/4 |
| 2008/0228463 | A1 | 9/2008 | Mori et al. |
| 2009/0063130 | A1 * | 3/2009 | Moore ................. G06F 40/44 704/4 |
| 2009/0258333 | A1 * | 10/2009 | Yu ........................ G09B 5/04 434/157 |
| 2010/0063819 | A1 | 3/2010 | Emori |
| 2013/0173255 | A1 | 7/2013 | Ehsani et al. |
| 2014/0136189 | A1 | 5/2014 | Ehsani et al. |
| 2018/0373952 | A1 * | 12/2018 | Bui ................... G06K 9/00456 |

OTHER PUBLICATIONS

Weinman, J. J., Butler, Z., Knoll, D., & Feild, J. (2013). Toward integrated scene text reading. IEEE transactions on pattern analysis and machine intelligence, 36(2), 375-387., 2014 (Year: 2014).*

Tsujimoto, S. Asada, H. Understanding multi-articled documents. In Proceedings of the 10th International Conference on Pattern Recognition. (1990) 551-556.

Matihew Hurst and Tetsuya Nasukawa Layout and language: integrating spatial and linguistic knowledge for layout understanding tasks. In Proceedings of COLING—18th conference on Computational linguistics {2000).

Aiello, M., Monz, C., Todoran, L., Worring, M. Document understanding for a broad class of documents. International Journal on Document Analysis and Recognition—IJDAR 5(1) (2002) 1-16.

Aiello, M, Smeulders, A.M.W. Thick 2d relations for document understanding. Technical Report # DIT-02-0063, Univ. of Amsterdam (2002).

Breuel, T.M.: High performance document layout analysis. In Proceedings of the 2003 Symposium on Document Image Understanding (SDIUT '03). (2003).

Tomas Mikolov, Martin Karafiat, Lukas Burget, Jan "Honza" Cernocky, Sanjeev Khudanpur. Recurrent neural network based language model. In Proceedings of Interspeech {2010). 1045-1048.

Sepp Hochreiter, Jorgen Schmidhuber Long Short-Term Memory. Journal Neural Computation: vol. 9 Issue 8, Nov. 15, 1997. pp. 1735-1780.

R. Collobert, K. Kavukcuoglu, C. Farabet. Torch7: A MATLAB-like environment for machine learning. In BigLearn, NIPS Workshop, 2011.

B Zoph, A Vaswani, J May, K Knight. Simple, Fast Noise-Contrastive Estimation for Large RNN Vocabularies. In NAACL, 2016.

Weinman, J. J., Butler, Z., Knoll, D., & Feild, J. (2013). Toward integrated scene text reading. IEEE transactions on pattern analysis and machine intelligence, 36(2), 375-387.

Momtazi, S., & Sameti, H. (Nov. 2009). A Possibilistic Approach for Building Statistical Language Models. In 2009 Ninth International Conference on Intelligent Systems Design and Applications (pp. 1014-1018). IEEE.

* cited by examiner

FIG. 1A
(Prior Art)

AUTOMATED WORKFLOWS FOR IDENTIFICATION OF READING ORDER FROM TEXT SEGMENTS USING PROBABILISTIC LANGUAGE MODELS

BACKGROUND

Documents formatted in a portable document format (i.e. a PDF document) are commonly used to simplify the display and printing of structured documents. Such documents permit incorporation of a mix of text and graphics to provide a visually pleasing and easy to read document across heterogeneous computing environments. It is estimated that there are currently about 2.5 trillion files on the World Wide Web encoded as PDF documents.

It is often necessary to extract text from a document encoded in a portable document format. For example, text may be extracted from a document to (1) provide narration for the document via synthesized speech, (2) reflow the document for viewing on the small screen of a mobile device, (3) facilitate reading accessibility for visually impaired and motion-impaired users, (4) copy text from the document for pasting into another document, (5) analyze the document text, (6) search the document for phrases, (7) operate on text, (8) summarize the document, or (9) export the document to another format. Current tools can identify contiguous portions of text but unfortunately do not accurately identify discontinuous portions of text, for example, text that may be in multiple columns and that may be interspersed around images or other visual elements. Accordingly, once the text is extracted, the extracted text segments must be ordered and/or re-ordered so that the text segments are presented in a proper and logical reading order.

To identify reading order within text, some existing technologies generate documents with tags to indicate portions of text, but many existing documents are not tagged, and tagging tools cannot always correctly tag existing documents. Other technologies employed to identify reading order include segmenting and labeling segments, such as "title" and "body," using spatial information within a document to determine document structure, applying topological sorting. Unfortunately, none of these solutions provides a sufficiently flexible solution for the large number of existing documents encoded in a portable document format.

SUMMARY

The present invention is directed towards providing automated workflows for the identification of a reading order from text segments extracted from a document. Text segments may include segments of text. For instance, a text segment may include one or more tokens (e.g. words), sentences, sentence fragments, paragraphs, paragraph segments, titles, captures, textual inserts, section headings, and the like. Ordering the text segments is based on trained natural language models. In some embodiments, the workflows are enabled to perform a method for identifying a sequence associated with a document, such as but not limited to a portable document (i.e. a document formatted in a portable document format or simply a PDF document). The methods include iteratively generating a probabilistic language model, receiving the document, and selectively extracting features (such as but not limited to text segments) from the document. The method may generate text segment pairs or feature pairs. That is, the method may generate and/or identify pairs of features, such as but not limited to pairs of text segments. For each text segment pair, a score is determined based on the probabilistic language model. The text segments are ordered based on the scores and can be provided in the determined order. The method may provide the extracted features in the determined order. That is, the extracted text segments are re-ordered in the most likely order that provides a correct reading order.

In some embodiments, generating the probabilistic language model may include training the language model based on training data that includes ground-truth word sequence patterns. An n-gram model may be employed to train the probabilistic language model based on the training data. In other embodiments, a recurrent neural network may be employed to train the probabilistic language model based on the training data. One such non-limiting embodiment of a recurrent neural network includes a long short-term memory neural network.

In some embodiments, the method also includes receiving feature types to extract from the document. The method may employ a parser to generate a recursive descent to traverse the document based on the set of feature types. The method may further extract the features based on the set of feature types and the recursive descent. The parser may be a JavaScript Object Notation (JSON) parser.

In some embodiments, the method may update statistical distribution based on the extracted features. A language model may be selected from various trained language models based on the updated statistical distribution. An order for other features extracted from another portable document may be determined based on the selected language. In at least one embodiment, a sequence for the text segment or feature pairs, generated via user annotations, may be received. A distance metric may be determined based on the comparison of the sequence to the order automatically generated via the method. The probabilistic language model may be updated based on the distance metric.

BRIEF DESCRIPTION OF THE DRAWINGS

Figure 1A:
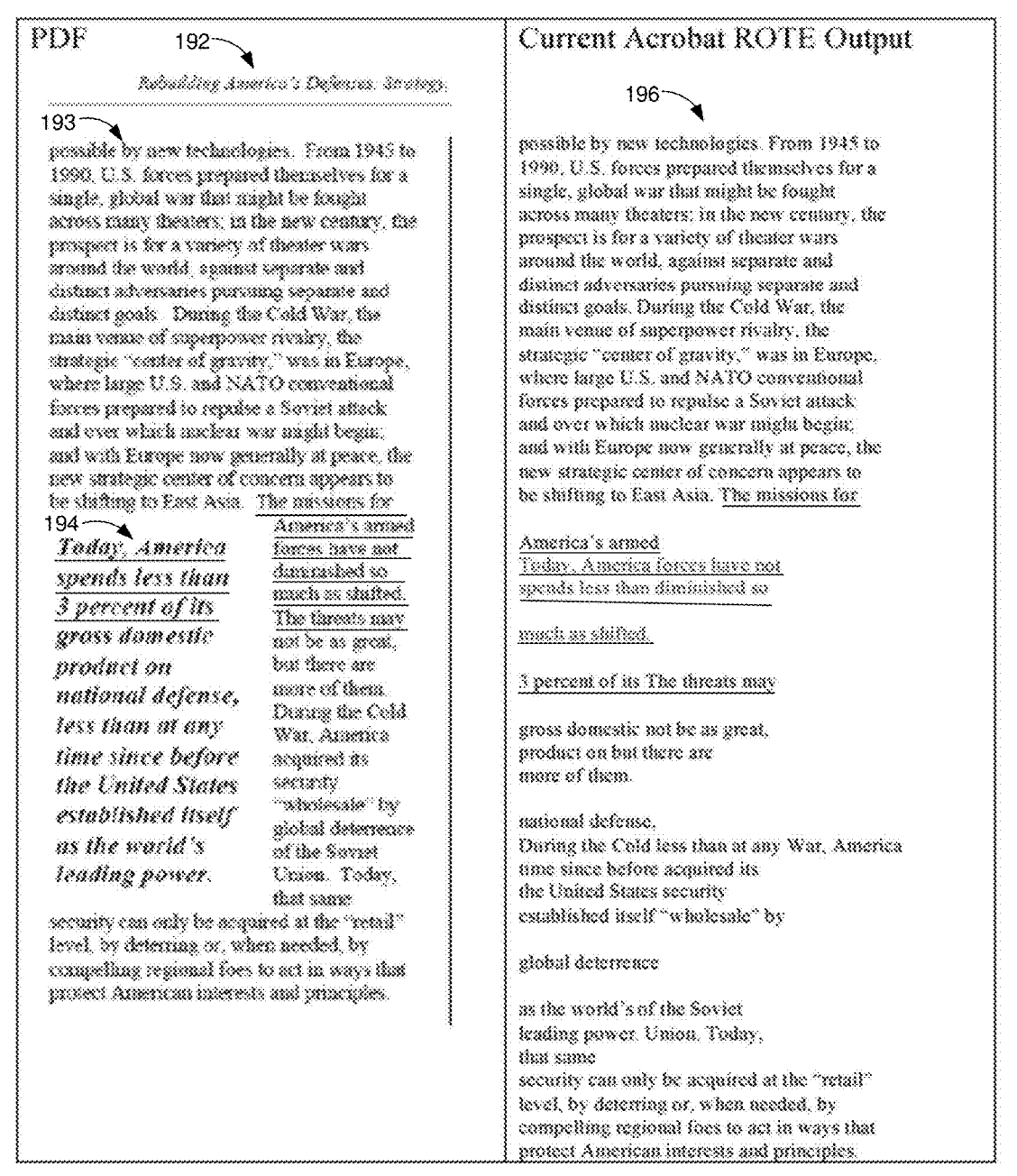

FIG. 1A shows a sample PDF file with a sample output from a previously available Reading Order Extraction technique.

DETAILED DESCRIPTION

Figure 1B:
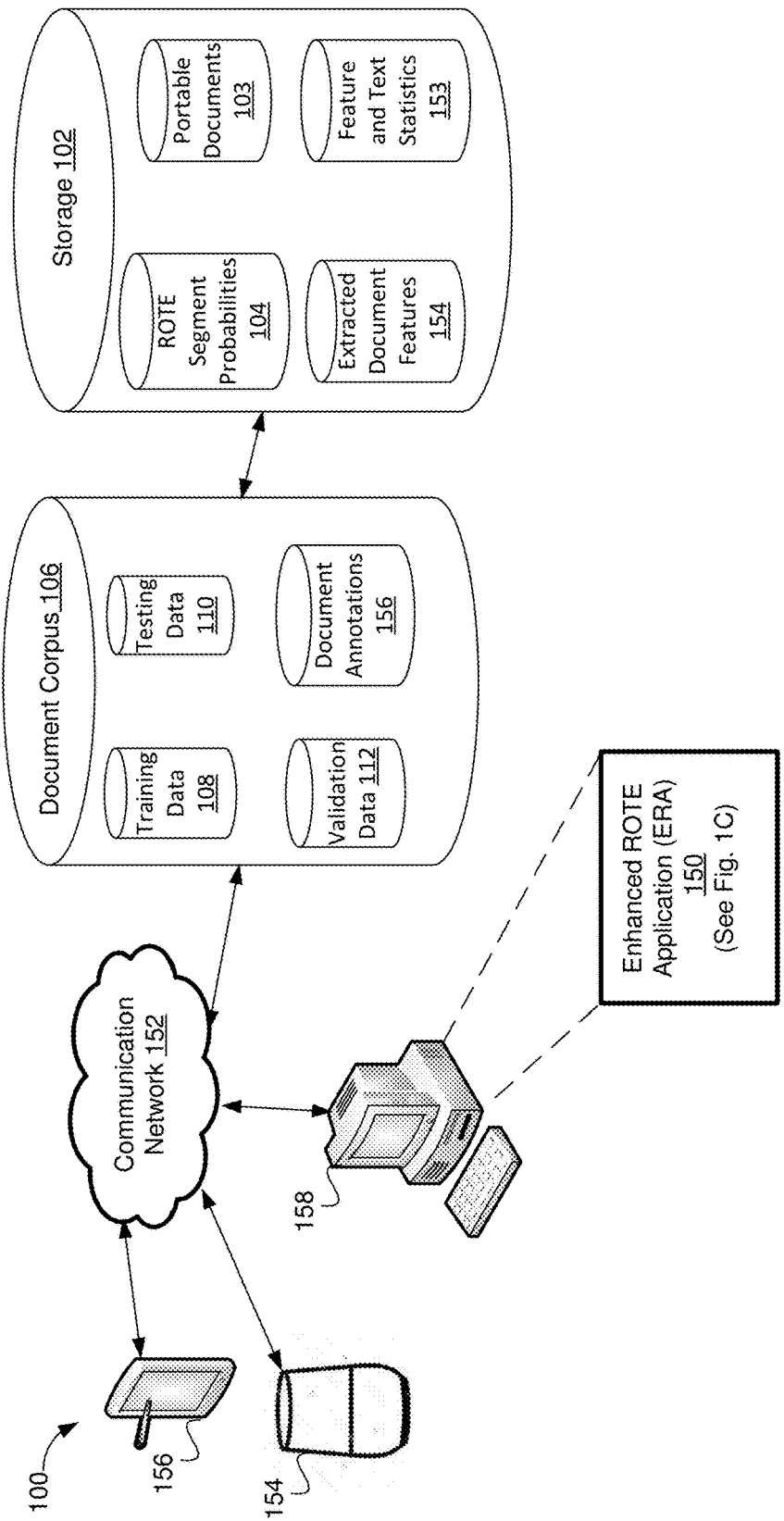
FIG. 1B shows an embodiment of a system 100 that enables an automated workflow that extracts a reading order from a document.

Briefly stated, various embodiments are directed towards systems and methods that provide automated workflows for performing enhanced Reading Order Text Extraction (ROTE) on documents, including but not limited to documents formatted in a portable document format (e.g. PDF documents). The workflows provide a platform for the annotation of documents included in a corpus and the generation of language models based on the annotated documents. Once the language models are generated, the workflows may receive previously unseen documents. Upon extracting text segments from the previously unseen documents, the language models are employed to provide a correct reading order of the extracted text segments of the previously unseen document. A user may confirm the provided correct order and/or provide annotations to the unseen document. The confirmation and/or annotations to the unseen document may be employed to update the language models. Upon receiving subsequent unseen documents, the updated language modes can be used to provide a correct reading order for the subsequently received documents.

Previously available ROTE systems have relied upon software libraries that employ heuristics and ad hoc rules. Such heuristics and rules may be brittle and conflict with one another. For instance, heuristics targeting scientific literature, which often includes various figures, tables, and mathematical or chemical formulas, may not effectively function well when applied to historical texts. Other previously available ROTE systems may require significant manual interaction from a user. Such ROTE systems generally do not exploit the power of trained language models. Additionally, previous ROTE systems generally reflect a clear domain specificity. For instance, the classification of blocks as 'title' and 'body' is appropriate for magazine articles, but not for administrative documents. Moreover, many of the previous systems are directed towards scientific journal articles, and not towards general purpose documents of virtually any context.

In contrast to these previously available ROTE systems, the various embodiments enable the annotation of a large document corpus. Such annotations may indicate a ground-truth reading order of text segments, such that the annotated documents may be used to generate and/or train language models to perform ROTE (i.e. the annotated documents within the corpus are employed as training data for the generation of language models). Upon obtaining an unseen document for which reading order is to be identified, the various embodiments further extract features (e.g. text segments) of the unseen document. The extracted features are provided to the language models to generate the correct reading order of the unseen document. More specifically, the language models are employed to suggest a reading order of the text segments. Furthermore, in embodiments, statistics of the extracted features can be generated from the processed documents. Such statistics may be employed to determine which language model to use when re-ordering segments of an unseen document. A user may annotate the re-ordered unseen document to provide additional training data to update and improve the language models. In summary, the workflows included in the embodiments further provide automatic mechanisms for the feature extractions, training data set creation, and the generation of language models to be used for enhanced ROTE.

To demonstrate further contrast, previous approaches to ROTE (i.e. non-enhanced ROTE and/or prior-art ROTE) do not provide accurate results across a variety of different documents encoded in a portable document format such as PDF. Consider the example shown in FIG. 1A which shows on the left side at 192 a PDF document of an article with the main body of text 193 formatted around an inset box shown at 194. While the inset box 194 inserts a visual discontinuity to the flow of text 193, the proper reading order is visually perceptible to a human reader. The results of previously available non-enhanced ROTE techniques, shown on the right at 196, provide an incorrect reading order. As seen from the underlined text in results 196, the attempt at non-enhanced ROTE fails due to incorrectly locating and splicing together continuing sentence segments across paragraphs and inset boxes.

The extracted text segments shown in results 196 are shown numbered below:

[1] The missions for
[2] America's armed
[3] Today, America [4] forces have not
[5] spends less than [6] diminished so
[7] much as shifted.
[8] 3 percent of its [9] The threats may
The splicing of candidate text segments:
1-2, 2-3, 3-4, 4-5, 5-6, 6-7, 7-8, and 8-9, do not make much sense. However, the various embodiments herein that employ a trained language model (i.e. enhanced ROTE) provide the text segment splices:

1-2, 2-4, 4-6, 6-7, 7-9 and separately, 3-5, 5-8, are much more likely using a language model that is trained via a large number (e.g. thousands) of documents. That is, the various enhanced ROTE embodiments herein provide a more likely ordering of the text segments than previously available ROTE methodologies.

More specifically, the workflows enable methods and/or processes that extract hierarchical features from document content (e.g., an unseen document). The document may be encoded in a portable document format (i.e. a PDF document). However, other embodiments are not so constrained and the document may be encoded via other document formats. Once extracted, the features may be ordered in a sequence that is the most likely correct reading sequence from all possible reading sequences. The ordering of the extracted features is based on trained natural language models. In non-limiting embodiments, the extracted features may include paragraphs, text segments, text spans, and the like. Such embodiments that provide the correct reading order for the extracted features (or text segments) based on trained language models may herein be referred to enhanced ROTE embodiments. Documents other than PDF documents processed by the various workflows may be general documents. That is to say, documents with general formatting structures (and directed towards virtually any non-specific subject matter that are not domain specific) may be processed via the various embodiments presented herein. For example, the various embodiments are not limited to scientific journal articles, academic textbooks, or other documents with predefined and/or structured formatting (i.e. the various embodiments are not limited to PDF documents).

As noted above, in contrast to previous available ROTE systems (e.g. non-enhanced ROTE systems), the embodiments herein employ various natural language models, which are generated by employing a large corpus of textual content as training data and validation data. The language models are probabilistic language models. One or more trained language models enable the embodiments to determine, via the language models, probabilities or likelihoods, for each possible pair of the extracted text segments. The probabilities are used to determine the correct ordering of the text segments.

Hierarchical features, such as but not limited to tags, headers, tables, text elements, captions, and the like may be extracted via a workflow employing a feature extraction module or a segmenter. Such headers may include chapter headers, section headers, sub-section headers, or the like. Furthermore, the various workflows may train language models via machine-learning (ML) techniques or algorithms. For instance, during training of one or more language models, word sequence patterns from a large text corpus for a given language are observed. That is, ML techniques are employed to observe statistical distributions of sequences of words. These distributions are employed to generate and/or train the language models. Once trained, the probabilistic language model measures whether splicing together a first text segment with another continuation text segment results in a phrase that is more likely than a phrase resulting from splicing together the first text segment with other continuation text segments.

A plurality of features, such as text segments, is first extracted from the document (a PDF document or another document type). Sets of ordered text segments are provided to the probabilistic language model to generate a probability score for each set of text segments. The probability score for each text segment (or text segment set) is indicative of a likelihood of the set providing a correct structured reading-order sequence.

When training a language model, the various embodiments of the workflows enable the automatic extraction of general features, such as but not limited to text segments, of portable documents included in the training data. Once features of the training data documents are extracted via a feature extraction module, the features may be arranged in a hierarchical representation of entities suitable for subsequent re-ordering. The feature extraction module may employ a parser functionality to recursively traverse the hierarchical representation and selectively determine various features, via recursive descent, from the hierarchical representation. The determined features are employed to train the natural language model via various ML techniques, such as iteratively comparing results to a ground-truth ordering of the text segments. For instance, various embodiments may employ deep learning to generate the natural language model based on the determined features.

During the traversal of the hierarchical feature representation, various statistics may be gathered for learned patterns within the hierarchical feature representation. The determined features and the learned language model may be iteratively updated based on the statistics. For instance, as the trained workflow is employed to process additional portable documents, statistics may be gathered and used to inform specific feature selection and machine learning for the target structured extraction task.

The training of a language model generally utilizes a ground-truth ordering of the text segments of each of the training and validation documents. To this end, the various embodiments enable a user to visually inspect and/or selectively filter the content features and artifacts, such as text segments, section headings, text ordering, and the like included in the portable documents of the corpus. Such selective filtering allows the user to analyze any document included in the corpus. Furthermore, the user may identify, view, and annotate various text features included in the training data documents, such as but not limited to text segments. Such text segments include but are not limited to paragraph text, paragraph spans, text-elements, and the like. Such annotations may be employed to establish the ground-truth ordering that is used to train and validate the language model, via various ML techniques. Thus, the various embodiments enable an end-to-end workflow that performs hierarchical structured extraction tasks on portable documents, such as but not limited to enhanced ROTE tasks. The workflow may be employed to fully automate such tasks.

As used herein, a portable document format is a file format used to present documents in a manner independent of application software, hardware, and operating systems. Each portable document file may encapsulate a description of a fixed-layout flat document, including the text, fonts, graphics, and other information needed to display it. A well-known example of a portable document format is the PDF format developed by Adobe Systems Incorporated and adopted by the International Organization for Standardization as ISO 32000-1 and 32000-2. A PDF document that is transmitted, such as by e-mail, from one computer platform, such as a Windows personal computer will appear the same on the screen of a receiving computer, even one that runs a different operating system, such as an Apple Mac, and will also appear the same visually when printed.

Additional aspects related to the invention will be set forth in part in the description, which follows, and in part will be apparent to those skilled in the art from the description, or may be learned by practice of the invention. Aspects of the invention may be realized and attained by means of the elements and combinations of various elements and aspects particularly pointed out in the following detailed description and appended claims.

FIG. 1B is a high-level schematic illustrating an embodiment of a system 100 that enables an automated workflow that extracts a reading order from a document. In one exemplary, but non-limiting embodiment, system 100 trains, via deep learning or other ML methods, one or more language models to be used to extract features from portable documents. System 100 may track the statistics of the extracted features. A visualization tool is provided so that a user may provide annotations that indicate the ground-truth for the reading order of portable documents included in training and validation data.

More specifically, system 100 processes at least a portion of document corpus 106 and extracts features (such as text segments) of documents included in document corpus to generate, via ML methods such as but not limited to deep learning, a probabilistic and/or statistical language model. The features may be extracted based on annotations previously provided to the documents in the document corpus 106. A statistical language model provides a probability distribution over sequences of words. Given such a sequence, say of length m, it assigns a probability $P(w_1, \ldots, w_m)$ to the whole sequence. In some embodiments, the language model is based on an n-gram classifier. In other embodiments, the language model is based on a recurrent neural network (RNN) architecture classifier, such as but not limited to long short-term memory (LSTM) classifier.

Once a language model is generated and validated, system 100 employs the language model to extract features from portable documents not included in document corpus 106, that is, previously unobserved (by system 100) portable documents (i.e. unseen documents). The various embodiments identify a reading order for text segments that are visually discontinuous but in a visually understandable reading order to a human reader of a document encoded in a portable document format. For instance, system 100 may extract content text, chapter and section headers, figures, tables, captions, optional tag elements, and the like included in the unseen document. System 100 represents these features in a hierarchical structure. System 100 employs the hierarchical structure and a trained language model to generate probabilities that indicate a meaningful reading order of content text. System 100 may re-order and/or re-arrange the reading order based on the probabilities.

The language model may be iteratively updated via additional training data and/or processing additional documents. For instance, system 100 enables a user to readily and quickly annotate portable documents (i.e. a user may generate a ground-truth reading order for features of the portable documents via annotation tools). The annotated portable documents may be added to the document corpus 106 and be employed to iteratively update the language model. Thus, various language models may be tailored to specific content types, subjects, or domains. System 100 provides an evaluation process that enables the selective extraction of document features. The language models may be customized and automatically evaluated (or validated) based on the user annotated ground-truth reading orders.

In FIG. 1B, system 100 may include one or more computing devices, such as but not limited to virtual-assistant (VA) device 154, user computing device 156, host computing device 158. Other embodiments may include more or less computing devices. Various embodiments of computing devices are discussed in conjunction with at least FIG. 10.

The various computing devices may be communicatively coupled via one or more communication networks, such as but not limited to communication network 152. System 100 may additionally include digital storage 102 and document corpus 106. Each of storage 102 and document corpus 106 may include non-transitory digital storage. Such storage may be volatile storage or non-volatile storage. As shown in FIG. 1A, each of storage 102 and document corpus 106 may be coupled to one or more of the computing devices via communication network 152.

Digital storage 102 stores portable documents 103 encoded in a portable document format, enhanced Reading Order Text Extraction (ROTE) segment probabilities 104, feature and text statistics 153, and extracted document features 154. Document corpus 106 includes training data 108, testing data 110, validation data 112, and document annotations 156. Digital storage 102 is shown generally but can take a variety of forms of storage for digital content including storage that is spread physically across numerous storage devices and also that is partially or wholly distant physically from other portions of system 100. Document corpus 106 is preferably a large collection of documents in a language of interest that provides statistically correct sentence text. The documents may be stored in a variety of formats and may be stored within digital storage 102 or separately from digital storage 102. In one embodiment, the documents in document corpus 106 are stored in text format and in another embodiment, are stored in a portable document format such as PDF. In other embodiments, the documents in the document corpus may be stored in a variety of formats. One example of a document corpus 106 is the collection of documents, or some subset, made available by the Gutenberg Project, details of which may be found at Gutenberg.org. The Gutenberg Project includes more than 50000 e-books, which provides a sufficiently large corpus of sentence data to permit training of the models described herein. Moreover, the text format of Gutenberg provides a good paragraph-wise distribution of text to provide well-defined reading order candidates. Document corpus 106 includes training data 108, testing data 110 and validation data 112, each of which may be a distinct set of documents. In other words, testing data 110 is comprised of a different set of documents from document corpus than training data 108 and validation data 112, and validation data 112 is comprised of a different set of documents than training data 108 and testing data 110. The document corpus may be of one of a variety of languages and in one embodiment is in the English language.

Communication network 152 may be any communication network, including virtually any wired and or wireless communication technologies, wired and/or wireless communication protocols, and the like. It should be understood that communication network 152 may be virtually any communication network that communicatively couples a plurality of computing devices and digital storage in such a way as to enable users of computing devices to exchange information via the computing devices.

One or more computing devices, such as but not limited to host computing device 158, may host and/or otherwise execute functionalities of an enhanced ROTE application (ERA) 150. Functionalities of ERA 150 enable the various embodiments of automated workflows discussed herein. In other embodiments, user-computing device 156 and/or VA device 154 may host ERA 150. In one exemplary but non-limiting embodiment, a user may view the extracted and re-ordered features of a portable document via user-computing device 156. In another non-limiting embodiment, VA device 154 may narrate the correctly ordered text from one or more portable documents. Various embodiments of ERA are discussed in conjunction with FIG. 1C.

Figure 1C:
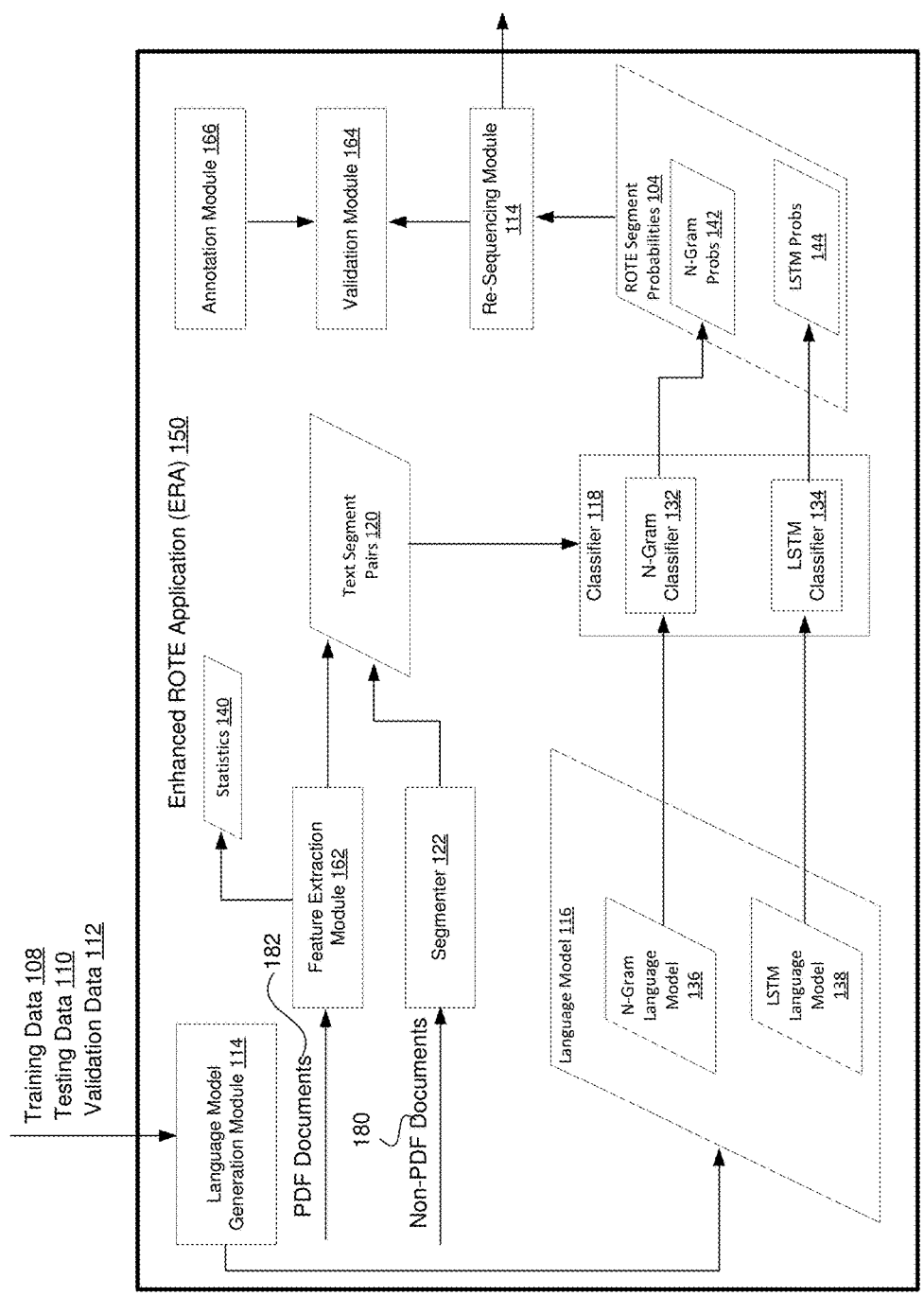
FIG. 1C shows a high-level schematic of an exemplary embodiment of an enhanced Reading Order Extraction application.

FIG. 1C shows a high-level schematic of an exemplary embodiment of ERA 150. Briefly, ERA 150 enables the automated workflows discussed herein. During both training and run-time phases of operation of ERA 150, the one or more language models may be trained and/or updated. Generally, the workflows extract features (e.g. text segments) from input documents (training documents, testing documents, validation documents, and unseen documents). For instance, a workflow extracts features during run-time (employing ERA 150 to determine the reading order for previously unseen documents), as well as, training, validation and testing runs. A workflow provides the trained language model and pairs of text segments of the extracted text segments to a classifier. In some embodiments, each possible pairing of the extracted text segments is provided to a classifier.

The classifier receives each possible pairing of the text segment pairs and determines a probability for each possible pair that the pair forms a "good" order via the language model. The probabilities may be stored via ROTE segment probabilities 104. The best ranked segments pairs are employed to reorder and/or sequence the document text to generate the suggested reading order.

More specifically language model generation module 114 first trains one or more language models, such as but not limited to language model 116. Various embodiments of training and/or generating a language model are discussed in conjunction with FIG. 3. However, briefly, training data 108 is employed to generate and/or train one or more language models. Validation data 112 may be employed to validate the trained language models. When training a language model, ERA 150 may employ a feature extraction module (or a segmenter), such as but not limited to feature extraction module 162, to extract features from documents included in training data 108. Such document features include but are not limited to textual features such as paragraphs, paragraph spans, text runs, and the like (i.e. text segments).

In some embodiments, the language model may be trained via natural language processing (NLP) methods, such as but not limited to n-gram trained. In other embodiments, the language model is a long short-term memory (LSTM) trained model. Accordingly, multiple language models may be generated. For instance, language model 116 includes an n-gram language model 136 and a LSTM language model 138.

Once the one or more language models are at least partially trained, previously unseen and/or unobserved documents, such as PDF documents 182 and/or non-PDF documents 180 of FIG. 1C, may be provided to ERA 150. ERA 150 extracts the features and provides pairs of features (such as text segment pairs) to a classifier, such as but not limited to classifier 118. Pairs of features may be referred to as feature pairs. As noted throughout, the features may include text segments. Similarly, pairs of text segments may be referred to as text segment pairs. The classifier (which in turn employs the language model) provides scores in the form of probabilities (i.e. ROTE segment probabilities 104) for various reading order sequences of the features of the unseen document. Thus, using the score, a re-sequencing module 114 may re-sequence and/or re-order the extracted text segments to provide the text segments in an order that is the most likely correct ordering.

ERA 150 may additionally employ an annotation module, such as but not limited to annotation module 166, to enable a user to provide annotations to indicate the correct (or ground-truth) reading order for at least a portion of the documents included in training data 108 or portable documents 103. That is to say, a user may provide annotations, such as but not limited to document annotations 156, that provide a ground-truth ordering. A validation module, such as but not limited to validation module 164, may compare the ground-truth orderings with the most likely correct reading order determined via ERA 150. Such a comparison may be used when initially training the language model and/or iteratively updating the language model.

ERA 150 may enable four generalized stages of operation: corpus processing, feature (e.g. text segment) extraction processing, text segment pair scoring and resequencing processing, and resequencing validation. Corpus processing includes employing document corpus 106 in statistical and/or deep learning methods (enabled via language model generation module 114) to generate one or more language models (e.g. n-gram language model 136 and LSTM language model 138). As discussed below, in the context of the text segment pair scoring and sequencing processing stage, the language models may be employed to determine whether (a) the last text segment from a paragraph or paragraph span forms a likely sentence with the first text segment of the next paragraph or paragraph span, or if (b) the last sentence from a paragraph forms a good continuation with the first sentence of the next paragraph.

Language model generation module 114 generates probabilistic language model 116 which is used by classifier 118 to generate ROTE segment probabilities 104 for text segment pairs 120. The text segment pairs are generated by either a feature extraction module 162 (for PDF documents) or a segmenter 122 (for non-PDF documents). Various embodiments of feature extraction module 162 and segmenter 122 generating text segment pairs 120 is discussed in conjunction with at least FIG. 8. However, briefly, feature extraction module 162 and/or segmenter 122 generate text segment pairs 120 from a (PDF or non-PDF) document. As discussed in conjunction with FIG. 8, in addition to generating text segment pairs 120, feature extraction module 162 may generate statistics 140 of the processed documents.

In the text segment pair scoring and resequencing processing stage of the operation of ERA 150, classifier 118 operates on text segment pairs 120 to generate ROTE segment probabilities 104 from language model 116. Note that more than one classifier may be employed. For instance, n-gram classifier 132 may employ n-gram language model 136 to generate n-gram probabilities 142. Likewise, LSTM classifier 134 can employ LSTM language model 138 to generate LSTM probabilities 144.

Re-sequencing module 114 can employ the various ROTE segment probabilities 104 to re-order the text segments. Re-sequencing module 114 can determine the best language model (and classifier) to employ for a given document based on each of the respective probabilities. The text segment pairs take the form of a plurality of sets of text segment pairs as shown in FIG. 1D.

Figure 1D:
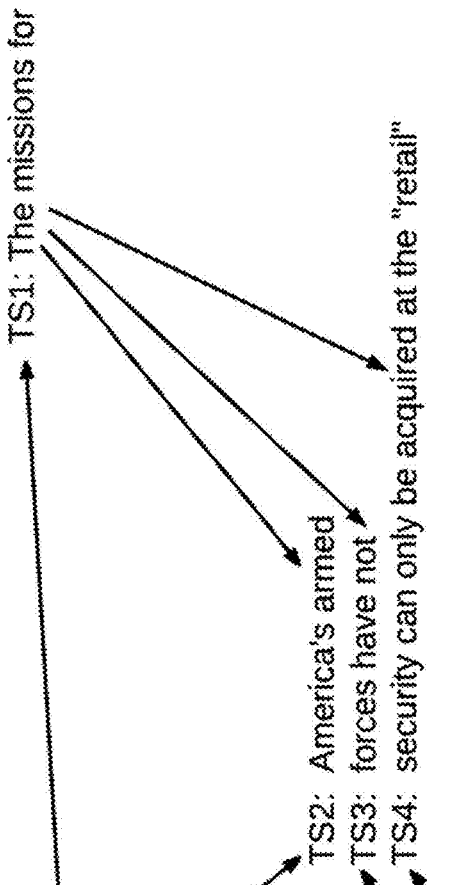
FIG. 1D illustrates the operation of a classifier.

As seen in FIG. 1D, three text segment pairs are generated for processing by classifier 118 to identify a likely candidate continuation text segment for base text segment TS1:

TS1, TS2
TS1, TS3
TS1, TS4

The classifier 118 provides for each text segment pair a probability indicating the likelihood that the candidate continuation text segment (TS2, TS3, TS4) represents the proper reading order continuation text segment for the base text segment (TS1).

In the resequencing validation stage of the operation of ERA 150, a subset of the document corpus 106 may be manually annotated by a user employing annotation module 164. Annotation module may include a visualization tool and/or a user interface (UI). The annotations may be ground-truth reading order annotations that are to be used in training the various language models. The validation module 164 may compare the ground-truth reading orders generated via the user annotations and the reading orders generated by classifier 118. For instance, a distance metric, such as but not limited to a levenshtein distance metric, may be determined to generate a validation score. The validation score may be employed as feedback to the language model generation module 116 during the training of the one or more language models. Furthermore, the validation score may be used to evaluate and update language models during normal run-time use of ERA 150 as new and different documents are added to document corpus 106. Thus, various language models may be tuned and/or updated based on the various documents.

Figure 2:
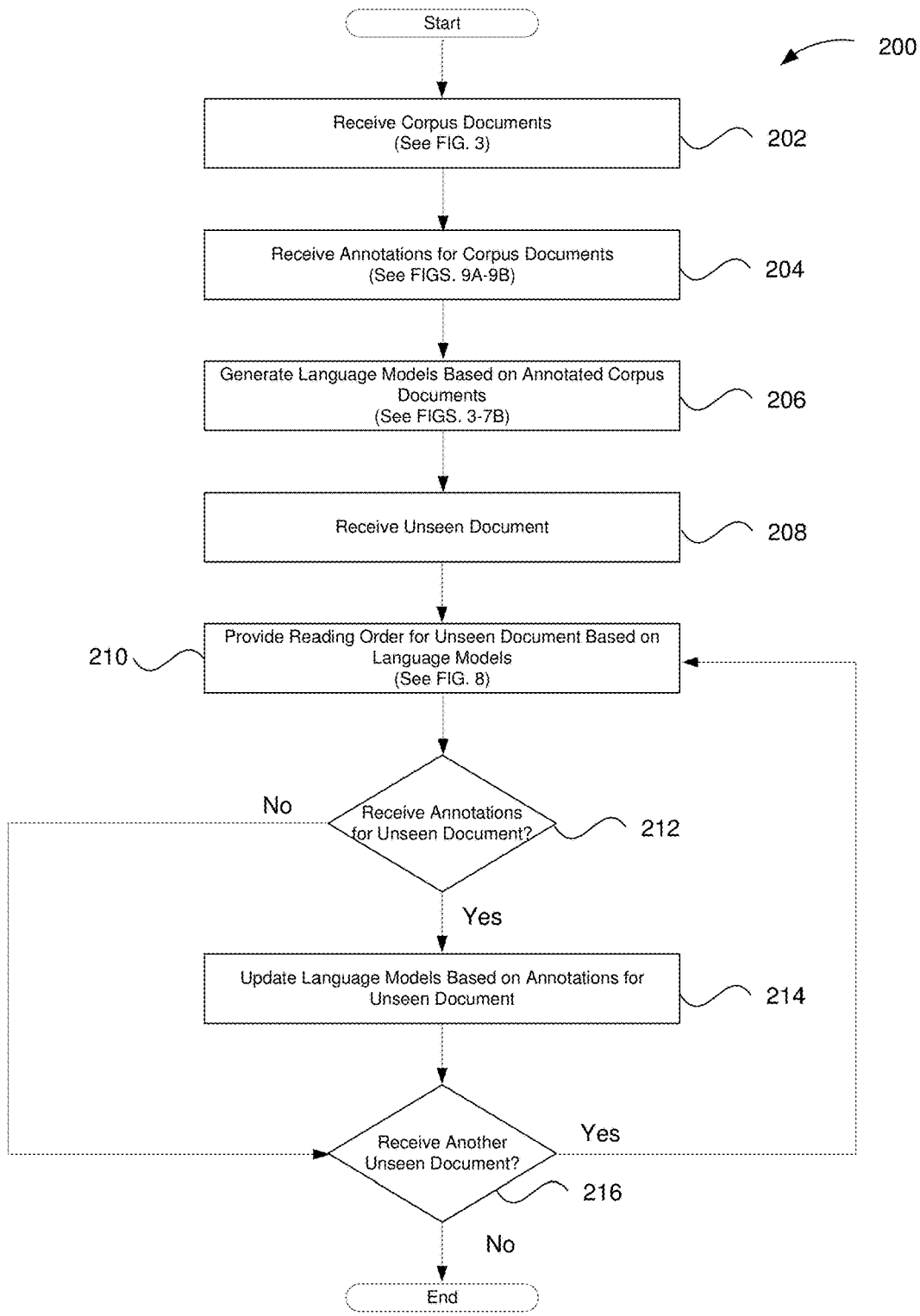
FIG. 2 is a flowchart illustrating steps for providing a reading order of a document in accordance with the various embodiments.

FIG. 2 is a flowchart illustrating steps for providing a reading order of a document in accordance with the various embodiments. For instance, ERA of FIGS. 1B-1C may be employed to implement at least portions of process 200. Process 200 begins, after a start block, at block 202 where corpus documents are received. Various embodiments for receiving corpus documents are discussed in conjunction with FIG. 3. However, briefly, receiving corpus documents may include receiving training data, testing data, and/or validation data. At block 204, annotations for at least a portion of the corpus documents may be received. Various embodiments of users providing annotations for documents are discussed in conjunction with at least FIGS. 9A-9B.

At block 206, one or more language models are generated based on the annotated corpus documents. Various embodiments of generating language models are discussed in conjunction with FIG. 3-7B. However, briefly here, a language model generation module may generate at least a n-gram language model and/or a LSTM language model. At block 208, a previously unseen document may be received. For instance, a user may provide a previously unseen (by the ERA) PDF or non-PDF document.

At block 210, a reading order for the unseen document is provided. Various embodiments for providing a reading order of an unseen document are discussed in conjunction with FIG. 8. However, briefly here, a feature extraction module or a segmenter may be employed to generate text segment pairs within the unseen document. A classifier may be employed to generate ROTE segment probabilities for the text segment pairs. A re-sequence module may re-order the text segments based on the ROTE segment probabilities to provide the reading order of the unseen documents.

At decision block 212, it is determined whether annotations for the unseen document are received. For instance, in response to receiving the reading order, a user may provide annotations, such as those discussed in conjunction with FIGS. 9A-9B. The indications may be indicative of incorrect and/or non-optimal reading orders provided at block 210. If no annotations have been received, process 200 may flow to decision block 216. If annotations have been received, process 200 may flow to block 214.

At block 214, the language models may be updated based on the annotations for the unseen document. For instance, the annotations and the unseen document may be employed as further training data, testing data, or validation data. The training of the language models may continue based on this additional data. At decision block 216, it is determined whether additional unseen documents are received. If additional unseen documents are received, process 200 returns to block 210 to provide the reading order of the additional documents based on the updated language models. Otherwise, process 200 may terminate and/or return a calling process.

Figure 3:
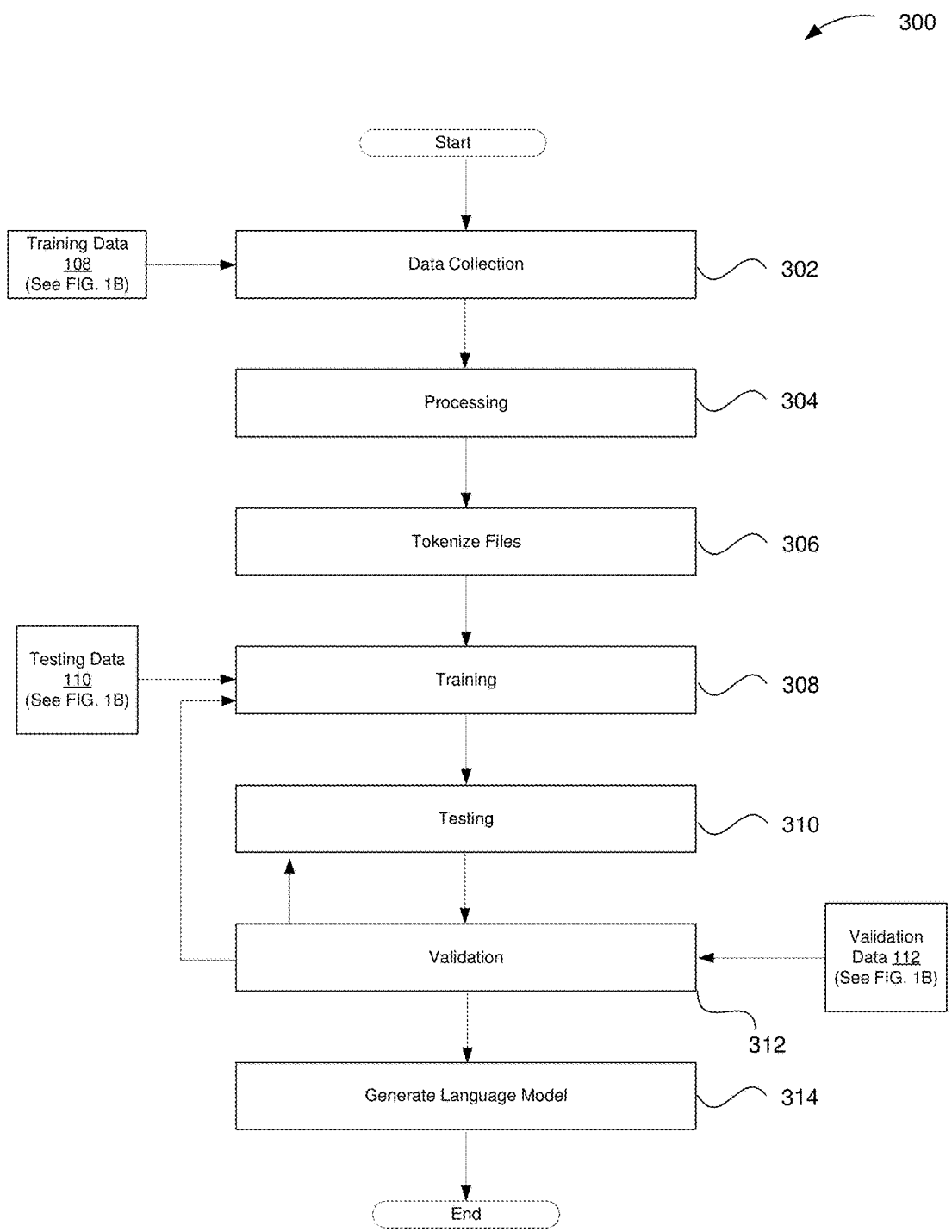
FIG. 3 is a flowchart illustrating steps for generation of a language model in accordance with the various embodiments.

FIG. 3 is a flowchart illustrating steps 300 for generating language models. For instance, language model generation module 114 of FIG. 1B may implement at least a portion of steps 300 to generate language model 116 (e.g., n-gram language model 136 and/or LSTM language models 138). At step 302, a corpus of documents, such as but not limited to training data 108 of FIG. 1B, is collected such as by identifying and copying files to document corpus 106 (of FIG. 1B) which may take the form of a file system for storing documents. The collected files are preprocessed at step 304 to concatenate all of the collected files into a single file and to remove extraneous characters to generate a file comprised of textual characters organized as sentences with associated punctuation. At step 306, the file is further processed to generate a token for each word in the file for use in training, testing and validation steps 308, 310 and 312. Tokens are words and all the tokens form a vocabulary.

Upon tokenizing the content within documents, the tokens can be used to train language models, as in block 308. Various methods can be employed to train language models, some of which are described herein. In one implementation, language model generation module 114 of FIG. 1C employs an n-gram model, and in particular, a 3-gram model, otherwise known as a trigram model. An n-gram model is a type of probabilistic language model that may be used to predict the next item in a sequence. An n-gram model models sequences, notably natural languages, using the statistical properties of n-grams. More concisely, an n-gram model predicts $x_i$ based on $x_{i-(n-1)}, \ldots, x_{i-1}$.

Expressed in probability terms this can be seen as $P(x_i | x_{i-(n-1)}, \ldots, x_{i-1})$.

An n-gram model in language modeling employs independence assumptions so that each word depends only on the last n−1 words. This Markov model is used as an approximation of the true underlying language. This assumption simplifies the problem of learning the language model from data. In other words, the probability of a word is conditioned on some number of previous words (one word in a bigram model, two words in a trigram model, etc.). Training of the 3-gram model preferably includes smoothing via a modified Kneser-Ney Smoothing to smooth the probability distributions generated by the n-gram model by assigning non-zero probabilities to unseen words. Kneser-Ney smoothing operates to calculate the probability distribution of n-grams in a document based on their histories. It employs absolute discounting by subtracting a fixed value from the probability's lower order terms to omit n-grams with lower frequencies. By way of example, if the bigram "San Francisco" appears many times in a training corpus, the frequency of the unigram "Francisco" will also be high. Relying on the unigram frequency to predict the frequencies of n-gram frequencies may skew results. Kneser-Ney smoothing corrects this by considering the frequency of the unigram in relation to possible words preceding it.

Figure 4:
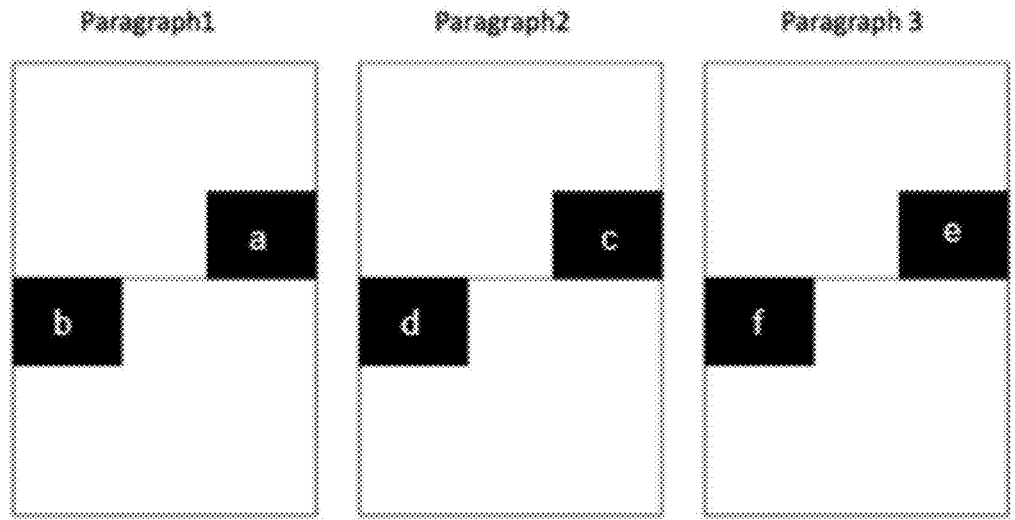
FIG. 4 is an illustration of paragraph segments employed by at least one of the various embodiments.

N-gram models tend to not perform very well on cross sentence boundaries. Consequently, language model generation module 114 in the n-gram embodiment splits all paragraphs in the training documents 108 into two paragraph segments, as shown in FIG. 4, which shows paragraph 1 split into segments a and b, paragraph 2 split into segments c and d and paragraph 3 split into segments e and f. In FIG. 4, the reading order candidates are segments b, d and f.

Testing 310 and validation 312 are performed iteratively by employing data sets that are distinct from training data, such as but not limited to training data 108. In one embodiment, the document corpus 106 includes 35000 e-books for training data 108, 10000 e-books for testing data 110 and 5000 e-books for validation data 112. Validation data can be repeatedly used during the training to computer model parameters. However, the testing data can be only used to test the performance of the model. At step 314, the language model, such as but not limited to n-gram language model 136 of FIG. 1C is generated. Machine learning techniques may be employed to generate the language model.

Additional and/or alternative language models may be generated. For instance, step 308 may employ a Recurrent Neural Network (RNN), and in particular, a particular kind of RNN known as a Long Short Term Memory (LSTM) network, which is capable of learning long-term dependencies. Since LSTM models are capable of learning longer term dependencies, this embodiment takes whole sentence sequences into account rather than just two words as in case of the 3-gram model. A RNN accepts an input vector and provides an output vector that is a function of, in other words that it is influenced by, the history of the input vectors provided. Since RNNs do not make a simplifying Markov assumption, they consider long term dependencies when modeling natural language. RNN's also allow operation over sequence of vectors and have greater representational power. RNN's operate by employing a sigmoid function, i.e. a bounded differentiable real function that is defined for all real input values and has a positive derivative at each point. By taking derivatives over multiple steps, RNN's exhibit what is commonly known as a vanishing gradient problem. In other words, the effect of earlier values can become negligible. An LSTM network addresses the vanishing gradient problem by permitting propagation of selected values to enable learning of longer term dependencies. Aspects of LSTM models are described by Sepp Hochreiter, and Jurgen Schmidhuber in Journal Neural Computation: Volume 9 Issue 8, Nov. 15, 1997 Pages 1735-1780.

An LSTM network operates in a manner to permit propagation of selected values. An LSTM network consists of a chain of repeating modules of a neural network. Each module has a cell state which may be changed by removing or adding information by way of three types of gates: input, forget, output. The forget gate provides a number between 0 and 1 to indicate the amount of information to pass through. A zero value indicates that no information will be passed, and a one value indicates that all information will be passed. The input gate defines how much of the newly computed state for the current input to pass through. The output gate defines how much of the internal state to expose to the external network (higher layers and the next time step).

Figure 5:
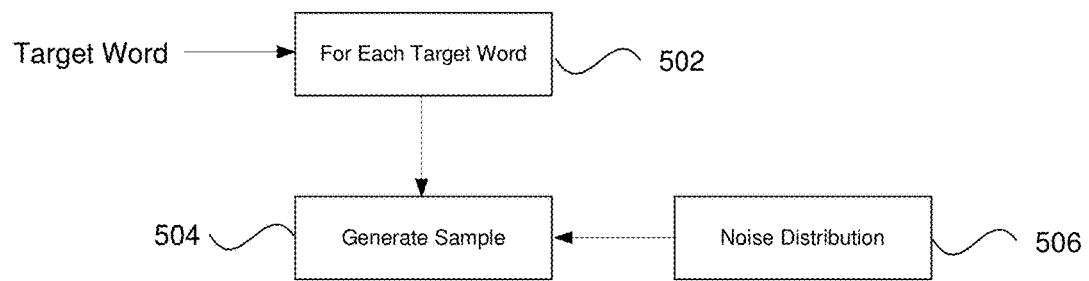
FIG. 5 is a flowchart illustrating operation of an embodiment to reduce memory usage.

Output of an LSTM can cause a bottleneck when training with a large number of files, i.e., large vocabularies (800,000 for 35,000 files). For a batch size=128 (number of sequences per batch) and a sequence length=50 (size of sequence to back propagate through time), the output of that layer will have a shape sequence length x batch size x vocab size, or 128×50×800000. For a Float Tensor or Cuda Tensor in Torch7 as described by B Zoph, A Vaswani, J May, and K Knight, in *Simple, Fast Noise-Contrastive Estimation for Large RNN Vocabularies*, NAACL, 2016 a single tensor will take up 20 GB of memory. Thus, the approximate memory consumption of a 4-layer LSTM with 2048 units will be 80 GB, which is computationally very expensive. Consequently, Noise Contrastive Estimation (NCE) as described by B. Zoph et al. may be employed as shown in FIG. 5. In NCE, for each target word 502 (the likelihood of which we want to maximize), some words are sampled 504 from a noise distribution 506, which is typically the unigram distribution. Thus, an LSTM language model, such as but not limited to LSTM language model 134 of FIG. 1C may be generated.

Figure 6:
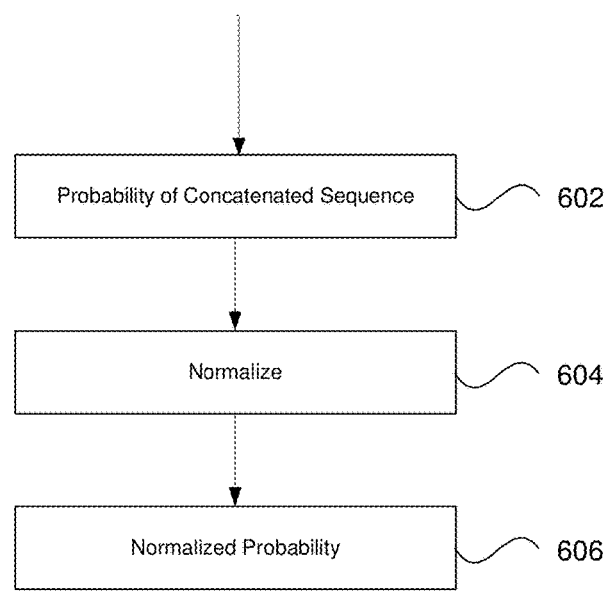
FIG. 6 is a flowchart illustrating output of an embodiment of a language model.

For testing, and in an operational mode, the last incomplete sentence of a paragraph segment is concatenated with the next three reading order candidates, which correspond to first incomplete sentence of the next three paragraph segments (paragraph segments b, d, f in FIG. 4). The LSTM model then provides, as shown in FIG. 6, the probability of these concatenated sequences 602, which is then normalized 604 by the length of the concatenated sequence to provide a normalized probability 606. This is done to prevent the length of the sentence affecting its likelihood in becoming the reading order candidate.

Figure 7A:
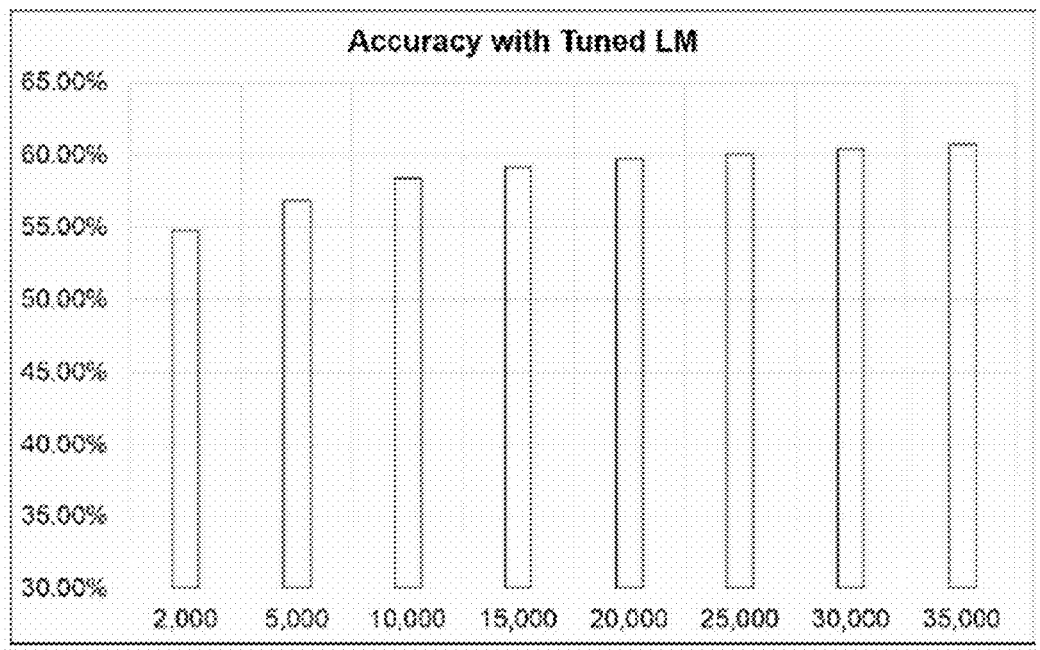
FIGS. 7A and 7B are graphs illustrating performance of two embodiments of language models.
Figure 7B:
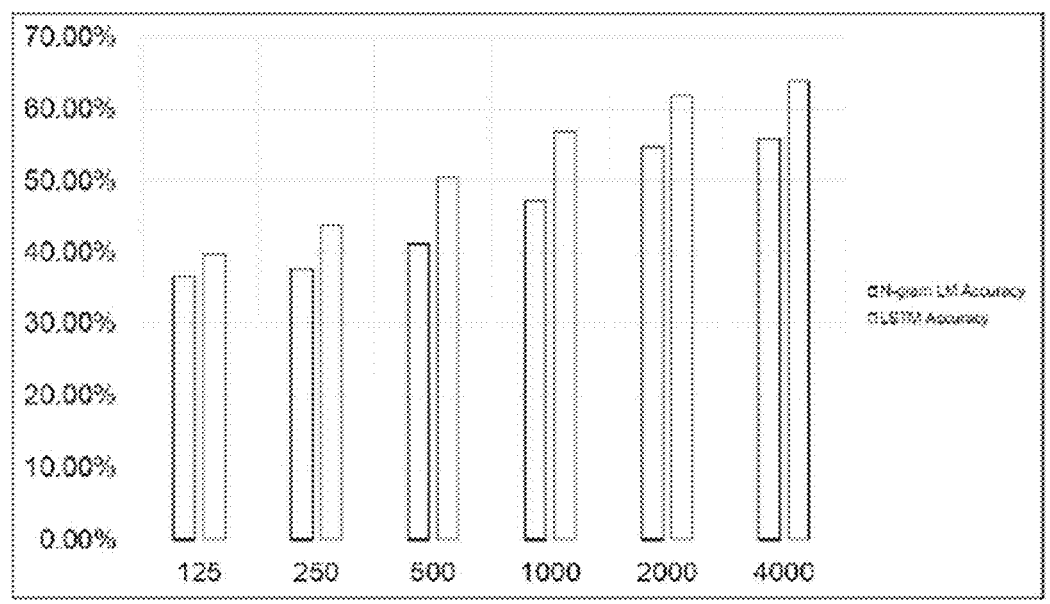

FIGS. 7A and 7B are graphs illustrating performance of the n-gram and LSTM embodiments. The results of the 3-gram model are shown in FIG. 7A, which depicts the accuracy in determining the correct reading order among the three candidates. With more training data, the accuracy of the model increases from approximately 55% with 2000 files to approximately 61% with 35000 files. FIG. 7B depicts the accuracy in determining the correct reading order as between the n-gram and the LSTM model. It can be noticed that LSTMs outperform the baseline n-gram models in detecting the correct reading order of a document. Moreover, with only 2000 training files, the LSTM model performed better than the n-gram model trained on all 35000 training files. For 4000 training files, the LSTM embodiment provided a higher accuracy of approximately 64%.

Figure 8:
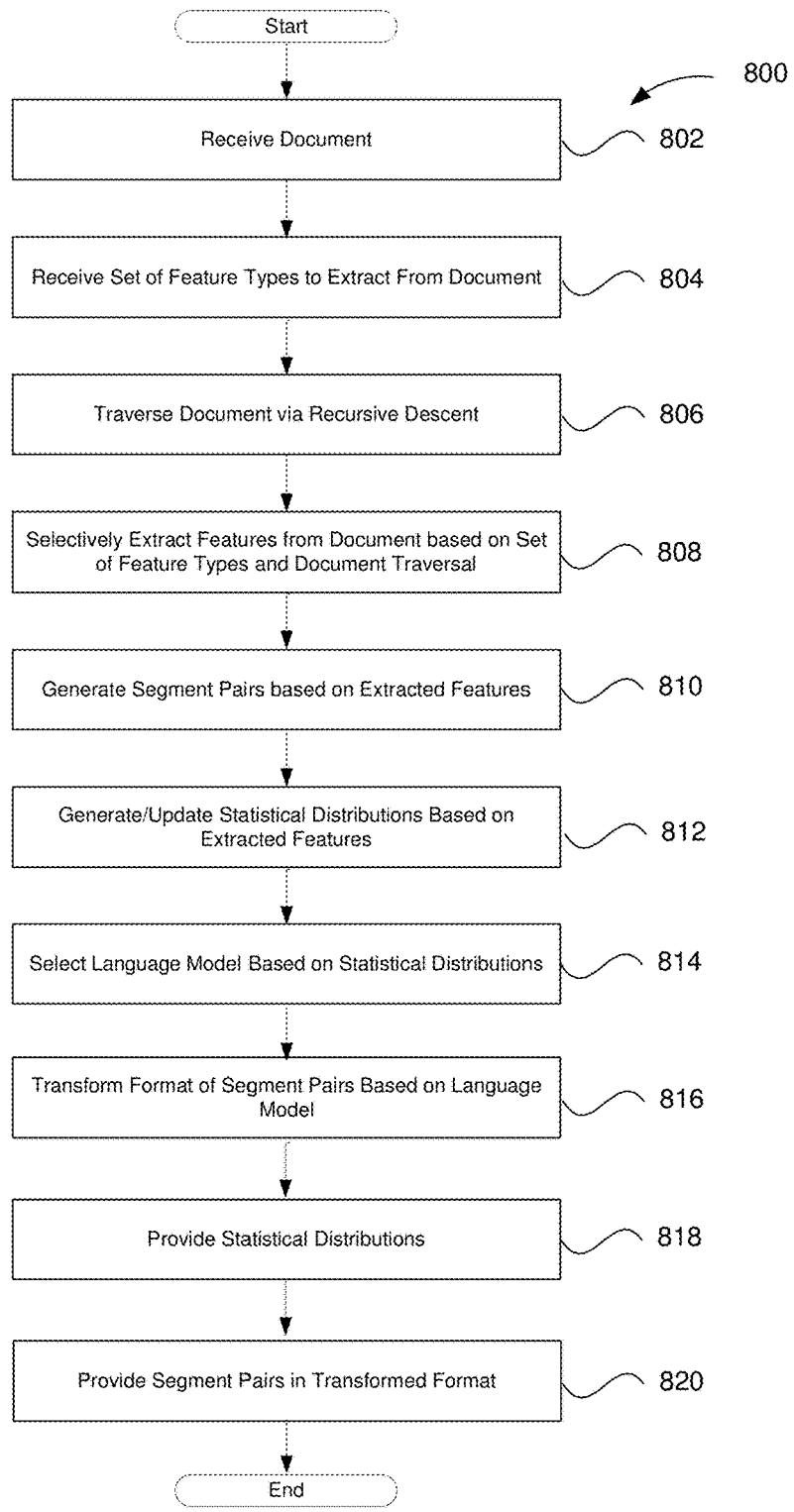
FIG. 8 is a flowchart illustrating steps implemented by feature extraction module to extract features from an unseen and/or training document.

FIG. 8 is a flowchart illustrating steps 800 implemented by feature extraction module 162 to extract features from an unseen and/or training document. At step 802, a document, such as a portable document is received. At block 804, a set of feature types to extract from the document is received. For instance, a list of types of textual features, such as paragraph and paragraph span elements or features, to extract may be specified at block 804. Other such feature types to extract from the received document includes tags, headers, figures, tables, and other textual elements. Feature types may include tags, headers, tables, text elements, captions, and the like. Such headers may include chapter headers, section headers, sub-section headers, or the like. At block 806, a parser embedded in the feature extraction module 162, may traverse the document via a recursive descent methodology. In one embodiment, the parser employs JavaScript Object Notation (JSON) data-exchange format.

In a various embodiments, the JSON parser accepts as input raw PDF document elements, such as but not limited to tags, headers, figures, tables, and text elements from block 804. Such input may be formatted in a JSON format. As block 806, the JSON parser may perform a recursive descent traversal over the document.

At block 808, the feature types are selectively extracted from the document via the document traversal. The JSON parser may extract the features. Such extracted features include, but are not limited to page numbers, paragraph spans, text segments, text spans, and the like. Thus, the extracted features may include text segments. The extracted document features may be stored via extracted document features 154.

At block 810, a parser generates and outputs reading order text segment pairs such as but not limited to text segment pairs 120 of FIG. 1C, based on the extracted features. For instance, as shown in FIG. 1C, the feature extraction module 162 may extract features (i.e. text segments) from a PDF document and generate text segment pairs 120 to provide to classifier 118. At block 812, a statistics engine included and/or embedded in feature extraction module 162 may generate and/or update various statistical distributions. The statistical engine may gather statistics regarding the extracted features across many documents to generate and/or update various statistical distributions. These statistics and statistical distributions may be employed to determine and/or select which language model from a plurality of trained language models and text segment classification and scoring methods to employ. For instance, FIG. 1C shows feature extraction module 162 generating statistics 140. Statistics may be employed to determine whether to employ n-gram language model 136 (and N-gram classifier) and/or LSTM language model 138 (and LSTM classifier 134).

The various statistical distributions may be distributions of features and feature pairs required to determine which ML and text segment pair classification and scoring to use. Essentially, the statistics measure the character pairs at the junction of two text segment pairs being considered for a reading order suggestions. In one example, one such distribution may indicate the proportion of time text segments require candidate further processing within a sentence, or require continuation processing from full sentence to the next candidate sentence.

At block 814, a language model is selected and/or determined from a plurality of language models based on the statistical distributions. For instance, statistics 140 may be employed to select either n-gram language model 136 and/or LSTM language model 138. At block 814, a scoring and/or classification system may also be selected. For instance, one or both of n-gram classifier 132 and/or LSTM 134 may be selected based on the selected language model. At block 816, the format of the segment pairs is transformed to the required text segment pair input format based on the selected language model and/or scoring/classification system. That is, the text segments may be formatted depending on whether an n-gram or an LSTM classifier is to be used. At block 818, the statistical distributions may be provided. For instance, the statistics and/or statistical distributions may be stored in feature and text statistics 153. At block 820, the segment pairs are provided. The provided segment pairs may be in the transformed format. The segment pairs may be provided to the selected classifier.

Figure 9A:
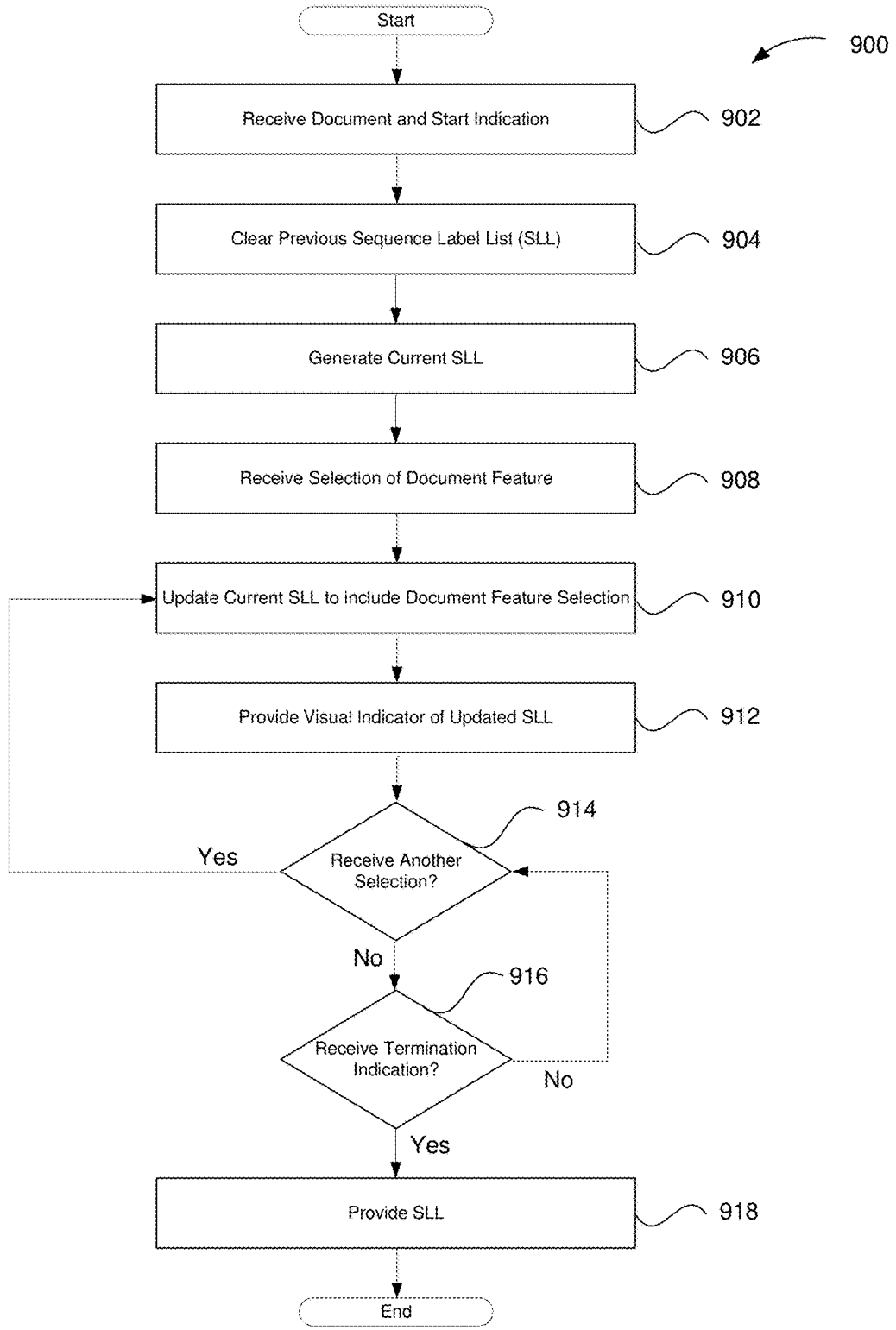
FIG. 9A is a flowchart illustrating steps implemented by an annotation module to enable a user to annotate a document to indicate ground-truth reading orders via a visualization tool.
Figure 9B:
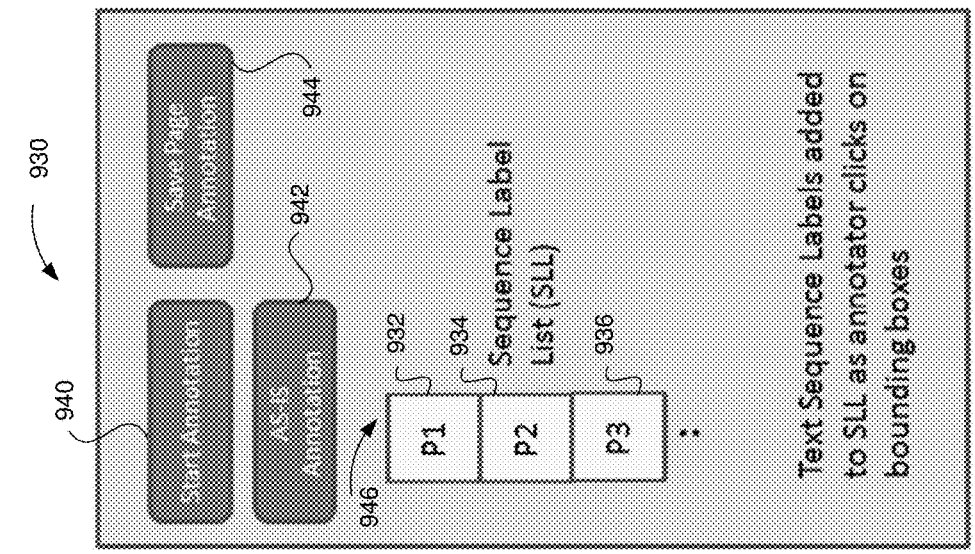
FIG. 9B shows a document that has been annotated by a user via a user interface provided by annotation module.
Figure 9B:

FIG. 9A is a flowchart illustrating steps 900 implemented by annotation module 164 of FIG. 1C to enable a user to annotate a document to indicate ground-truth reading orders via a visualization tool. FIG. 9B shows a document 920 that has been annotated by a user via a user interface (UI) 930 provided by annotation module 164. At step 902, document 920 is received by the visualizer tool included in annotation module 164. Furthermore, at block 902, a start indication may be received. For instance, a user may select a start annotation button 940 included in UI 930. At block 904, a previous sequence label list (SLL) is cleared and/or deleted. At block 906, a new SLL is generated. The recording of the new SLL may begin at block 906.

At block 908, a user selection of a document feature is received. For instance, the user may click on and/or generate via a click and dragging operation a bounding box highlighting a document feature, such as a paragraph or textual span. For example, document 920 shows various bounding boxes that bound document features. At block 910, the SLL is updated to include and/or append the selected document features. At block 912, a visual indicator of the updated SLL is provided. For instance, document 120 shows various visual indicators, including visual indicators 922, 924, and 926, to provide a visual indication of the sequence that the user selected for the reading order of document 120. In some embodiments, the SLL may be shown in the UI. For instance, UI 930 shows the SLL 946, which shows the sequence of the user's selection. SLL 946 includes elements 932, 934, and 936, corresponding to user selections 922, 924, and 926. In some embodiments, UI 930 may include AS-IS Annotation button, which sets the SLL equal to the default sequence via the visualizer tool.

At decision block 914, it is determined whether another user selection of another document feature is received. If another user selection is received, process 900 returns to 910 to append the new user selection to the SSL. If another user selection is not received, process 900 flows to decision block 916. At decision step 916, it is determined whether a termination indication selection is received from the user. For instance, UI 930 may include Save Page Annotation button 944 to terminate the annotation session. If no termination indication is received, process 900 returns to decision step 914. If a termination indication is received, process 900 flows to step 918.

Figure 9C:
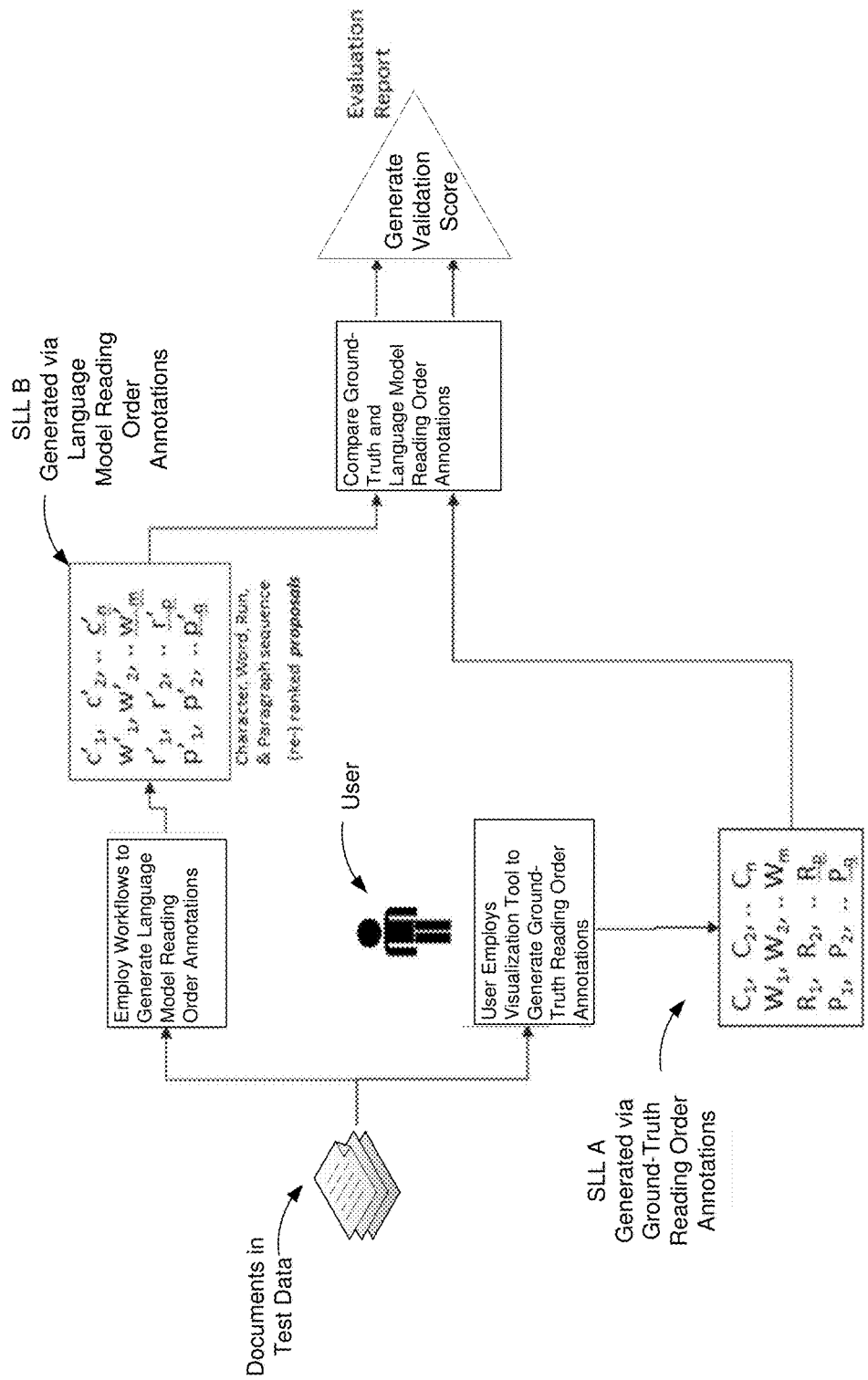
FIG. 9C shows a validation workflow.

At step 918, the SLL is provided. For instance, the SLL may be saved to document annotations 156. In at least one embodiment, the SLL is provided to validation module 164. FIG. 9C shows a validation workflow. In FIG. 9C, one or more documents, such as but not limited to documents included in testing data 110 are provided to a user to annotate via the various methods discussed in conjunction with at least FIGS. 9A and 9B. Such annotations may be ground-truth reading order annotations. Such annotations may include, or generating such annotations may include generating, a first sequence label list (SLL A). As shown in FIG. 9C, an SSL may include ranked reading orderings for characters (c), words (w), runs (r), paragraphs (p), and the like.

A second SSL (SSL B) is additionally generated automatically via the various embodiments described herein. SSL B may be included language model reading order annotations. The ground-truth SSL (SSL A) is compared to the language model SSL (SSL B) to generate a distance metric, such as but not limited to a levenshtein distance metric. The distance metric may be equivalent to, or employed to generate, a validation score. The validation score may be employed as feedback to the language model generation module 116 during the training of the one or more language models. Furthermore, the validation score may be used to evaluate and update language models during normal run-time use of ERA 150 as new and different documents are added to document corpus 106. Thus, various language models may be tuned and/or updated based on the various documents types.

Illustrative Computing Device

Figure 10:
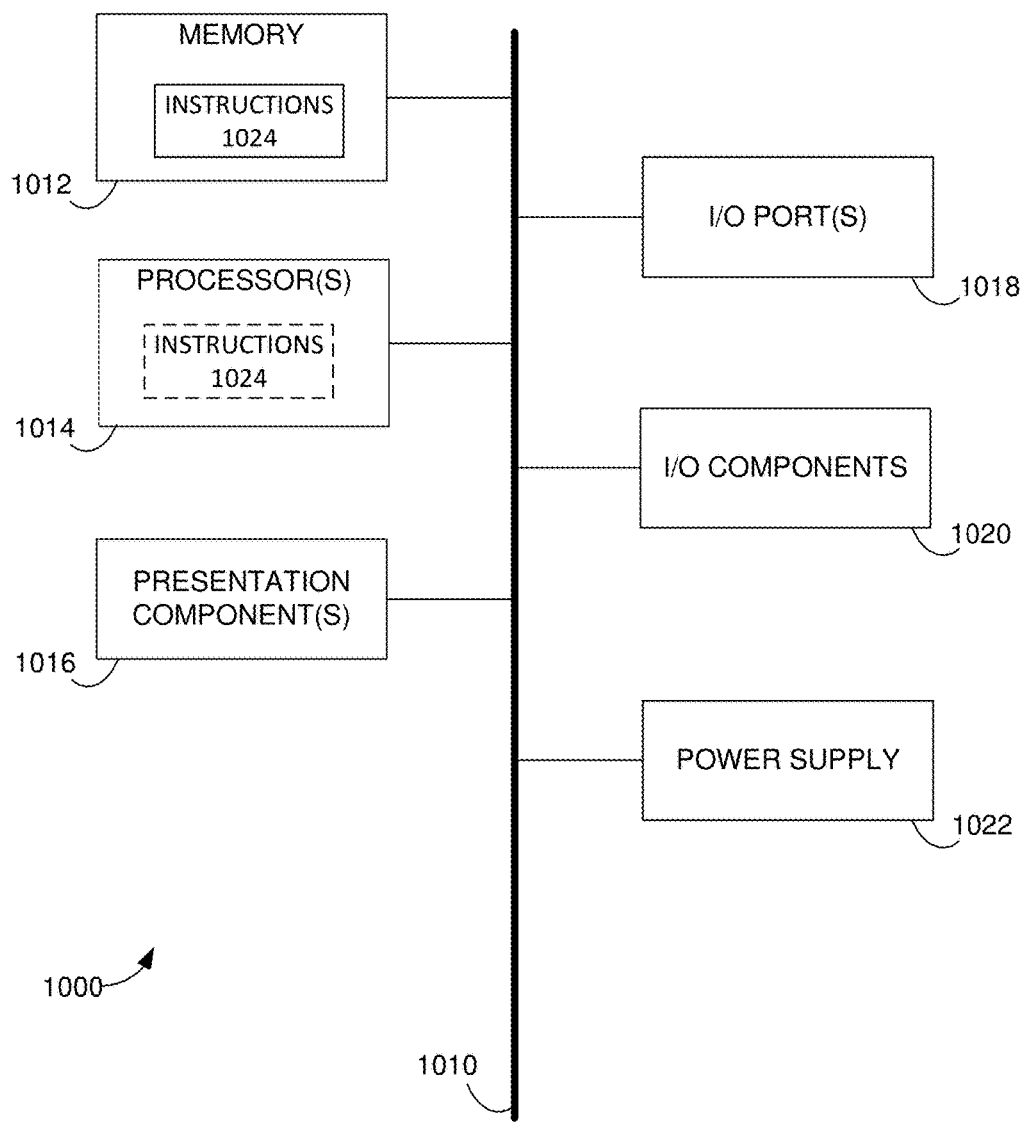
FIG. 10 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 10, an illustrative operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output ports 1018, input/output components 1020, and an illustrative power supply 1022. Bus 1010 represents what may be one or more busses (such as an address bus, data bus, or combination thereof). Although the various blocks of FIG. 10 are shown with clearly delineated lines for the sake of clarity, in reality, such delineations are not so clear and these lines may overlap. For example, one may consider a presentation component such as a display device to be an I/O component, as well. In addition, processors generally have memory in the form of cache. We recognize that such is the nature of the art, and reiterate that the diagram of FIG. 10 is merely illustrative of an example computing device that can be used in connection with one or more embodiments of the present disclosure. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. Memory 1012 may be non-transitory memory. As depicted, memory 1012 includes instructions 1024. Instructions 1024, when executed by processor(s) 1014 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Illustrative presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A non-transitory computer-readable storage medium having instructions stored thereon for identifying a sequence associated with a document, which, when executed by a processor of a computing device cause the computing device to perform actions comprising:

selectively extracting a plurality of text segments from textual content of the document;

identifying a plurality of text segment pairs, wherein each of the plurality of text segments pairs includes an ordered set of text segments from the plurality of text segments;

generating a score, for each of the plurality of text segment pairs, indicating a likelihood that the text segment pair provides a correct reading-order sequence, based on a probabilistic language model iteratively generated using training data having ground truth reading-order sequences; and providing at least a portion of the plurality text segment pairs in a sequential order based on the corresponding scores.

2. The non-transitory computer-readable storage medium of claim 1, wherein the actions further comprise iteratively generating the probabilistic language model by employing an n-gram model to train the probabilistic language model on the training data.

3. The non-transitory computer-readable storage medium of claim 1, wherein the actions further comprise iteratively generating the probabilistic language model by employing a recurrent neural network to train the probabilistic language model on the training data.

4. The non-transitory computer-readable storage medium of claim 1, wherein the document is a portable document format file and the actions further comprise:

receiving a set of feature types of the document;

employing a recursive descent to traverse the document based on the set of feature types; and selectively extracting the plurality of text segments based on the set of feature types and the recursive descent.

5. The non-transitory computer-readable storage media of claim 4, wherein the actions further comprise generating the recursive descent by employing a JavaScript Object Notation (JSON) parser to traverse the document.

6. The non-transitory computer-readable storage media of claim 1, wherein the actions further comprise:

updating a statistical distribution based on the extracted plurality f text segments;

selecting the probabilistic language model from a plurality of language models based on the updated statistical distribution; and providing an order of another plurality of text segments for another document based on the selected probabilistic language model.

7. The non-transitory computer-readable storage media of claim 1, wherein the actions further comprise:

receiving a sequence for the extracted plurality of text segments generated by user interactions;

generating a distance metric based on a comparison of the sequence for the extracted plurality of text segments and the order of the plurality of text segment pairs; and updating the probabilistic language model based on the distance metric.

8. A method for identifying a sequence associated with a document, comprising:

iteratively generating a probabilistic language model based on training data that includes a plurality of ground-truth reading-order sequences;

receiving the document, wherein the document includes textual content;

selectively extracting a plurality of features from the document, wherein the plurality of features includes at least a plurality of text segments of the textual content;

generating a plurality of feature pairs from the plurality of features, wherein each of the plurality of feature pairs includes a pair of features from the plurality of features;

generating a score, for each of the plurality of feature pairs, indicating a likelihood that the feature pair provides a correct reading-order sequence, based on the probabilistic language model;

determining an order of the plurality of features based on the score for each of the plurality of feature pairs; and providing each of the plurality of features in the determined order.

9. The method for claim 8, wherein iteratively generating the probabilistic language model includes employing an n-gram model to train the probabilistic language model on the training data.

10. The method of claim 8, wherein iteratively generating the probabilistic language model includes employing a recurrent neural network to train the probabilistic language model on the training data.

11. The method of claim 8, further comprising:

receiving a set of feature types to extract from the document;

employing a recursive descent to traverse the document based on the set of feature types; and selectively extracting the plurality of features based on the set of feature types and the recursive descent.

12. The method of claim 11, wherein a JavaScript Object Notation (JSON) parser is employed to generate the recursive descent to traverse the document.

13. The method of claim 8, further comprising:

updating a statistical distribution based on the extracted plurality of features;

selecting the probabilistic language model from a plurality of language models based on the updated statistical distribution; and providing an order of another plurality of features for another document based on the selected probabilistic language model.

14. The method of claim 8, further comprising:

receiving a sequence for the extracted plurality of feature pairs generated by user interactions;

generating a distance metric based on a comparison of the sequence for the extracted plurality of feature pairs and the order of the plurality of features; and updating the probabilistic language model based on the distance metric.

15. A computing system for identifying a sequence associated with a document, comprising:

a processor device; and a computer-readable storage medium, coupled with the processor device, having instructions stored thereon, which, when executed by the processor device, perform actions comprising:

steps for identifying a plurality of text segment pairs from textual content within the document, wherein each of the plurality of text segments pairs includes an ordered set of text segments from the textual content;

steps for generating a score, for each of the plurality of text segment pairs, indicating a likelihood that the text segment pair provides a correct reading-order sequence, based on a probabilistic language model iteratively generated using training data having ground truth reading-order sequences; and steps for providing at least a portion of the plurality of text segment pairs in a sequential order based on the corresponding scores.

16. The computing system of claim 15, the actions further comprising steps for iteratively generating the probabilistic language model by employing at least one of an n-gram model or a recurrent neural network to train the probabilistic language model on the training data.

17. The computing system of claim 15, the actions further comprising:
   steps for selectively extracting the plurality of text segments from the textual content of the document.

18. The computing system of claim 15, the actions further comprising:
   steps for receiving a set of feature types of the document;
   steps for employing a recursive descent to traverse the document based on the set of feature types; and
   steps for selectively extracting the plurality of text segments based on the set of feature types and the recursive descent.

19. The computing system of claim 15, the actions further comprising:
   steps for updating a statistical distribution based on the plurality of text segments;
   steps for selecting the probabilistic language model from a plurality of language models based on the updated statistical distribution; and
   steps for providing an order of another plurality of features for another document based on the selected probabilistic language model.

20. The computing system of claim 15, the actions further comprising:
   steps for receiving a sequence for the plurality of text segments generated by user interactions;
   steps for generating a distance metric based on a comparison of the sequence for the plurality of text segment pairs and the order of the plurality of the text segments; and
   steps for updating the probabilistic language model based on the distance metric.

* * * * *